(12) United States Patent
Liang et al.

(10) Patent No.: US 8,325,163 B2
(45) Date of Patent: Dec. 4, 2012

(54) STYLUS

(75) Inventors: Shi-Xu Liang, Shenzhen (CN); Chung-Yeh Sa, Santa Clara, CA (US)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 271 days.

(21) Appl. No.: 12/848,337

(22) Filed: Aug. 2, 2010

(65) Prior Publication Data
US 2011/0261024 A1   Oct. 27, 2011

(30) Foreign Application Priority Data

Apr. 26, 2010 (CN) .......................... 2010 1 0155955

(51) Int. Cl.
G06F 3/041 (2006.01)

(52) U.S. Cl. ........................ 345/179; 345/173

(58) Field of Classification Search .................... 401/55, 401/99, 100, 104–107, 196, 197, 202, 208, 401/209, 213, 192, 195, 243; 708/107; 345/179, 345/173, 174, 175, 176; 700/94; 178/19.01, 178/19.03, 19.04, 19.02

See application file for complete search history.

(56) References Cited

U.S. PATENT DOCUMENTS

| 7,195,415 | B1 * | 3/2007 | Vial ............................... 401/216 |
| RE40,272 | E * | 4/2008 | Chan ............................. 401/131 |
| 8,147,159 | B2 * | 4/2012 | Glesser et al. ................ 401/195 |
| 2005/0057535 | A1 * | 3/2005 | Liu et al. ....................... 345/179 |
| 2010/0302213 | A1 * | 12/2010 | Yeh ............................... 345/179 |

* cited by examiner

Primary Examiner — Kent Chang
Assistant Examiner — Nelson Rosario
(74) Attorney, Agent, or Firm — Altis Law Group, Inc.

(57) ABSTRACT

A stylus comprises a housing, an axle, a follower, a connecting rod, a stylus body and a pin. The housing has a receptacle and a guiding groove. The axle is rotatably mounted in the receptacle and a threaded portion formed thereon. The follower includes a main body, a nut screwed on the threaded portion and a guiding block slidably located in the guiding groove. The connecting rod is accommodated in the receptacle, the connecting rod defines a sliding groove. The stylus body has a body, a head and an pin hole aligned with the sliding groove. The pin is located in the housing. The pin is inserted in the pin hole and the sliding groove so the connecting rod and a second body end are hinged in the housing; a first connecting rod end is hinged near the center of the stylus body, the second connecting rod end is hinged to another side of the follower opposite to the nut.

16 Claims, 7 Drawing Sheets

STYLUS

CROSS-REFERENCE TO RELATED APPLICATIONS

This application is related to co-pending U.S. patent application Ser. NoS. 12/848,330, 12/848,334, AND 12/848,343, entitled "STYLUS", by Liang et al. These application have the same assignee as the present application and have been concurrently filed herewith. The above-identified applications are incorporated herein by reference.

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, personal organizers, etc. These devices typically include a display module under the touch screen. The display module generates icons associated with menu options, programs, user choices, and other operations. The user controls the device by pressing the touch screen over the icon with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, stylus-based or keyboard-based hand-held devices, remote control units, portable media players (such as an MP3 or DVD player) that have wireless communication capability. Accordingly, any reference herein to the mobile telephone should also be considered to apply equally to other portable wireless electronic devices.

Figure 1:
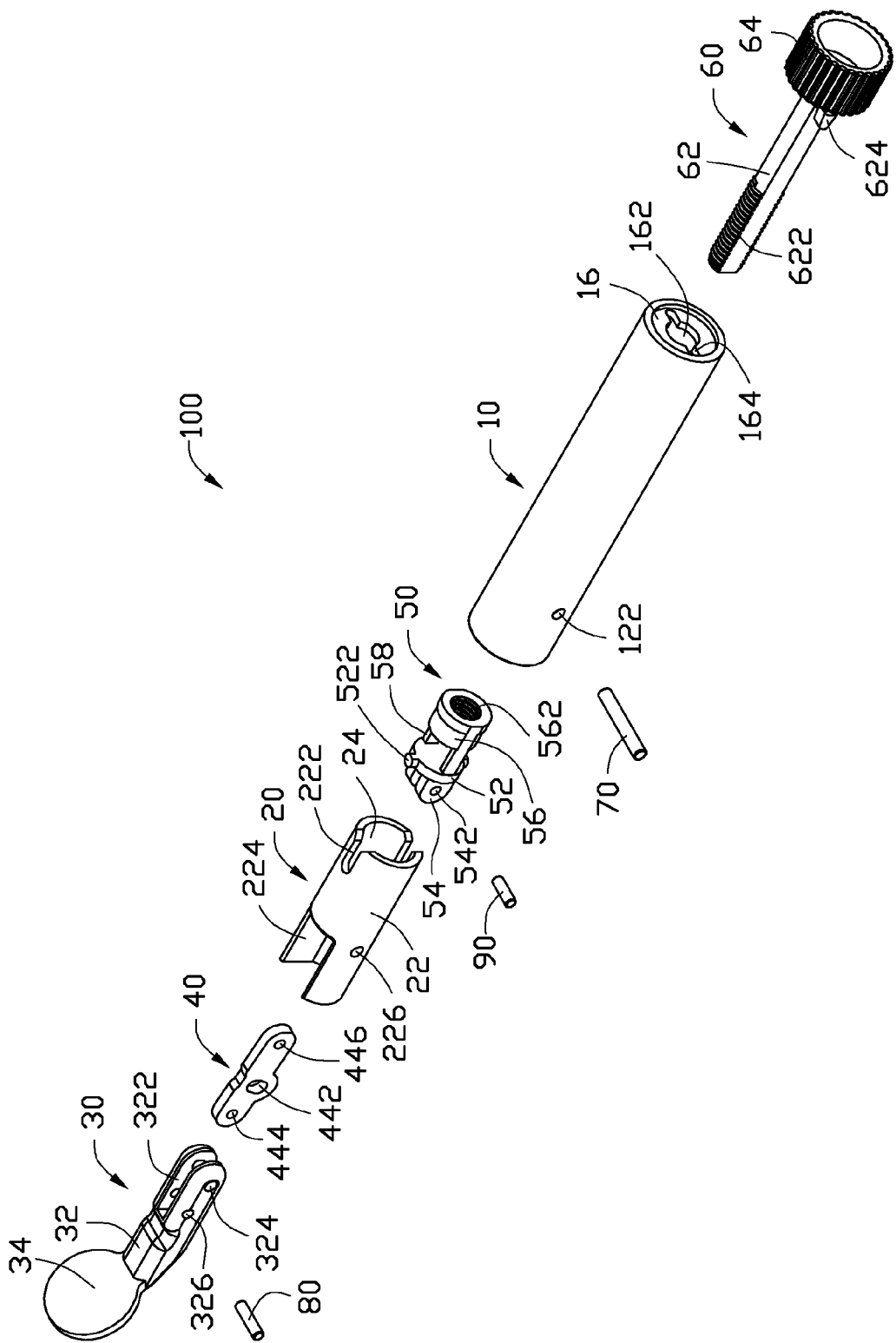
FIG. 1 is an exploded view of an exemplary stylus.
Figure 4:
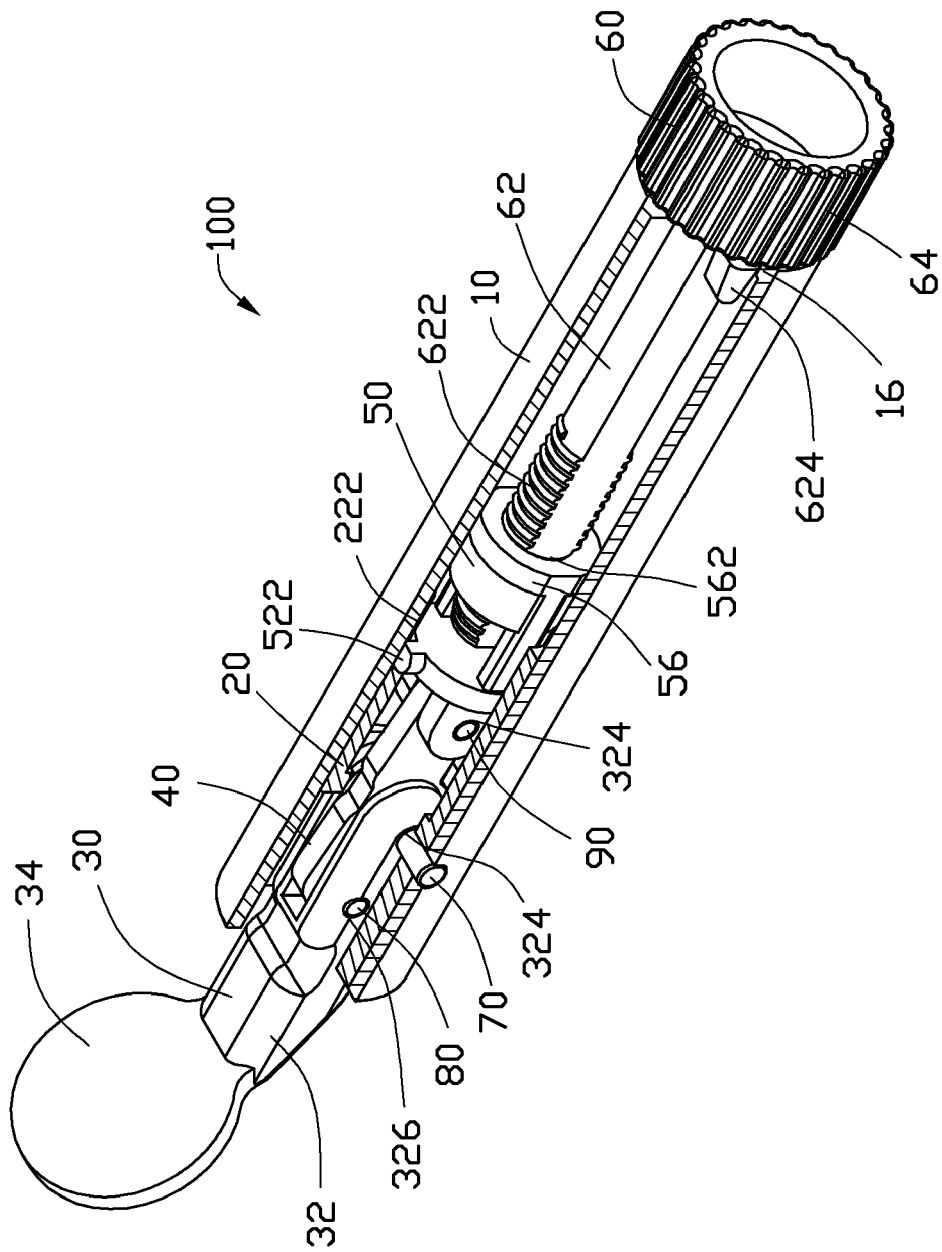
FIG. 4 is a cut-away view of the stylus shown in FIG. 3.

Referring to FIGS. 1 and 4, a stylus 100 includes a housing 10, a guiding element 20, a stylus body 30, a connecting rod 40, a follower 50 and an axle 60. The guiding element 20 is mounted in the housing 10. One end of the stylus body 30 is located in the guiding element 20 and is hinged near a center portion of the connecting rod 40 by a pin 70 which is located on the guiding element 20. One end of the connecting rod 40 is hinged near a center portion of the stylus body 30 by a post 80 and another opposite end of the connecting rod 40 is hinged to the follower 50 by a pole 90, and the center portion of the connecting rod 40 is hinged to the guiding element 20 by the pin 70. The follower 50 is slidably mounted in the guiding element 20; the axle 60 is rotatably mounted to the housing 10 so the axle 60 can rotate relative to the housing 10, and the axle 60 engages with the follower 50 to rotate the follower 50 relative to the axle 60.

Figure 2:
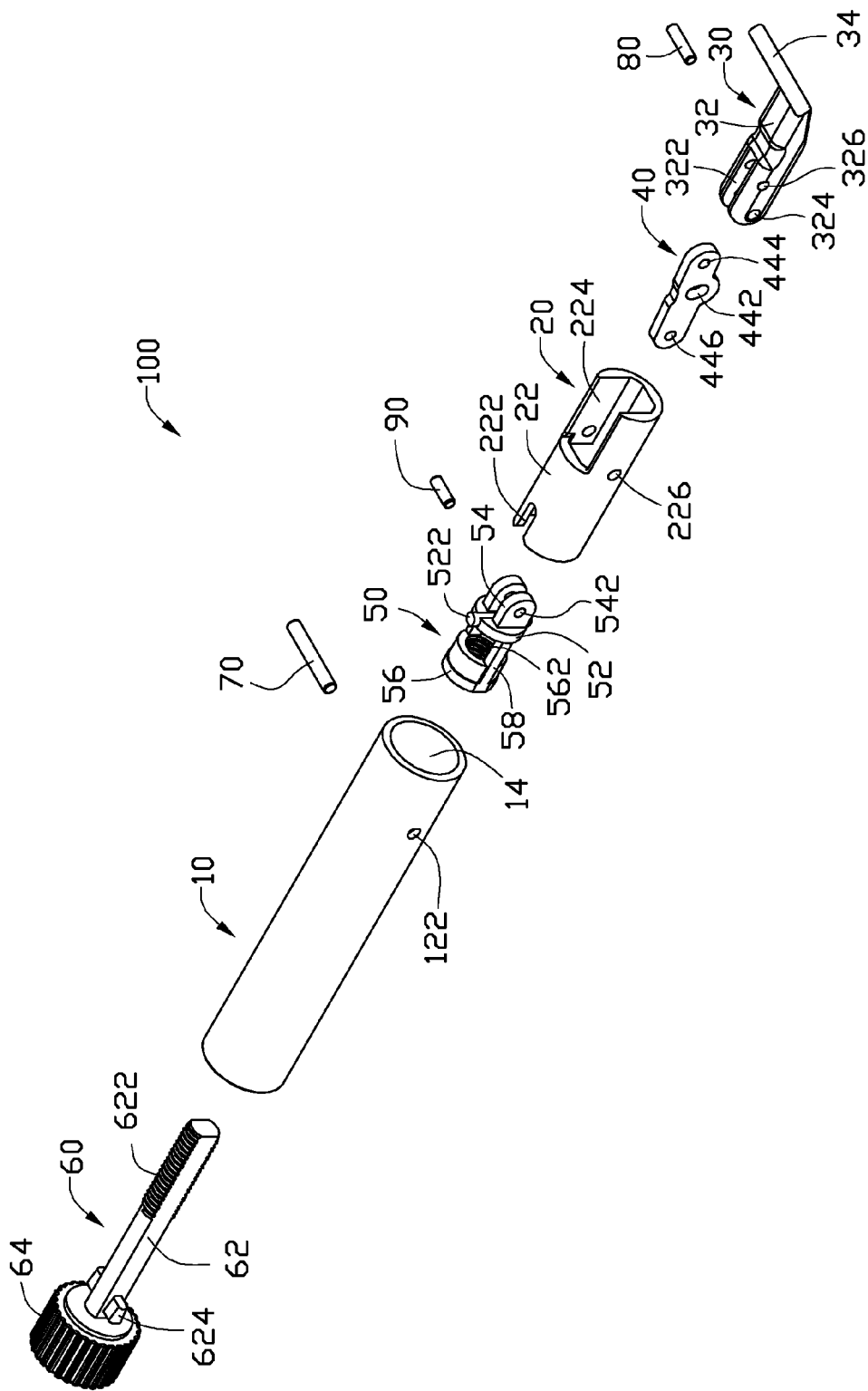
FIG. 2 is similar to FIG. 1, but showing the stylus in another aspect.
Figure 3:
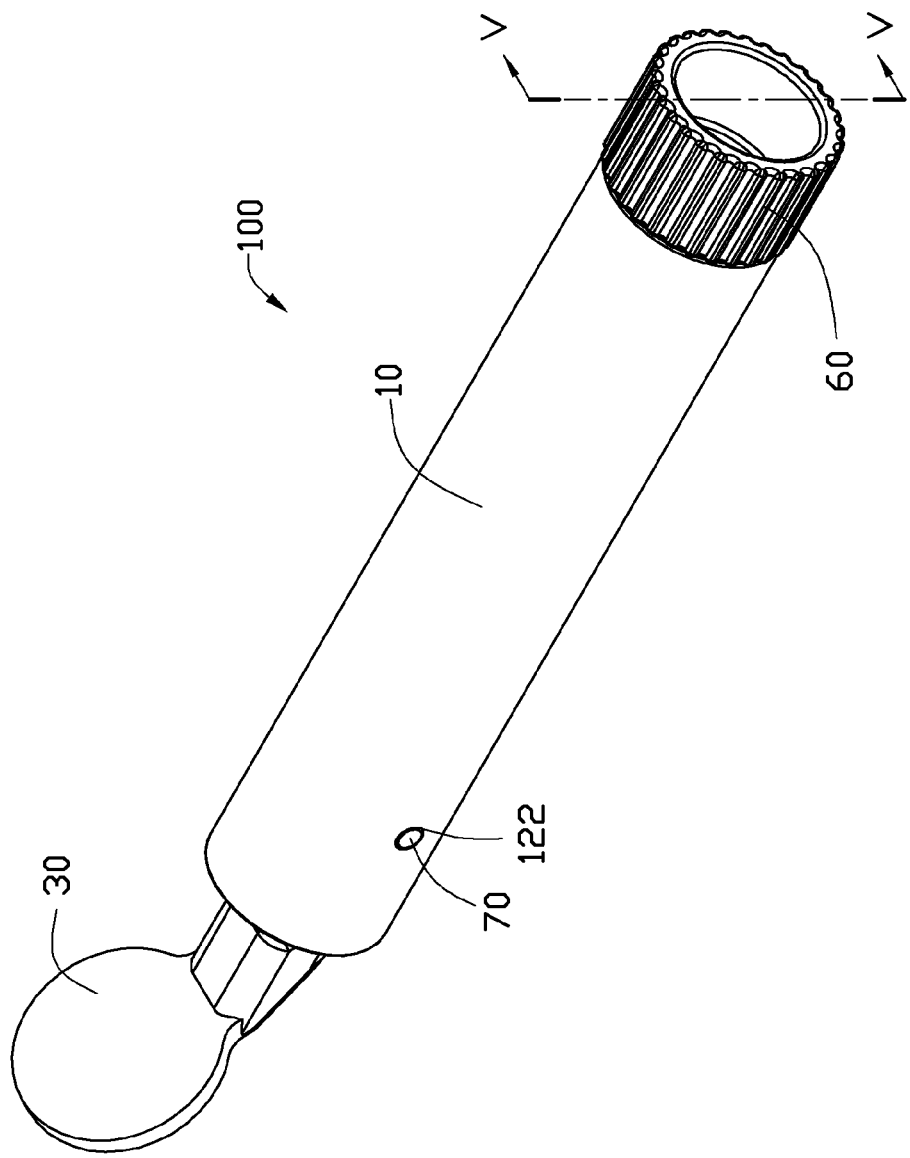
FIG. 3 is an assembled view of the stylus shown in FIG. 2.

Referring to FIGS. 1, 2 and 4, the housing 10 is tubular, and includes a receptacle 11 defined longitudinally therethrough and two retaining holes 122 located peripherally through the wall thereof and near a first end thereof. The retaining holes 122 are for retaining the pin 70 in the housing 10. The housing 10 further includes a retaining board 16 extending from an inner peripheral surface thereof positioned at a second end thereof, for retaining the axle 60 to the housing 10. The retaining board 16 partially closes the second end of the housing 10. The retaining board 16 defines an aperture 162 for the axle 60 passing through the retaining board 16, and two opposite slits 164 communicating with the aperture 162 so the axle 60 can easily pass through the retaining board 16.

Figure 6:
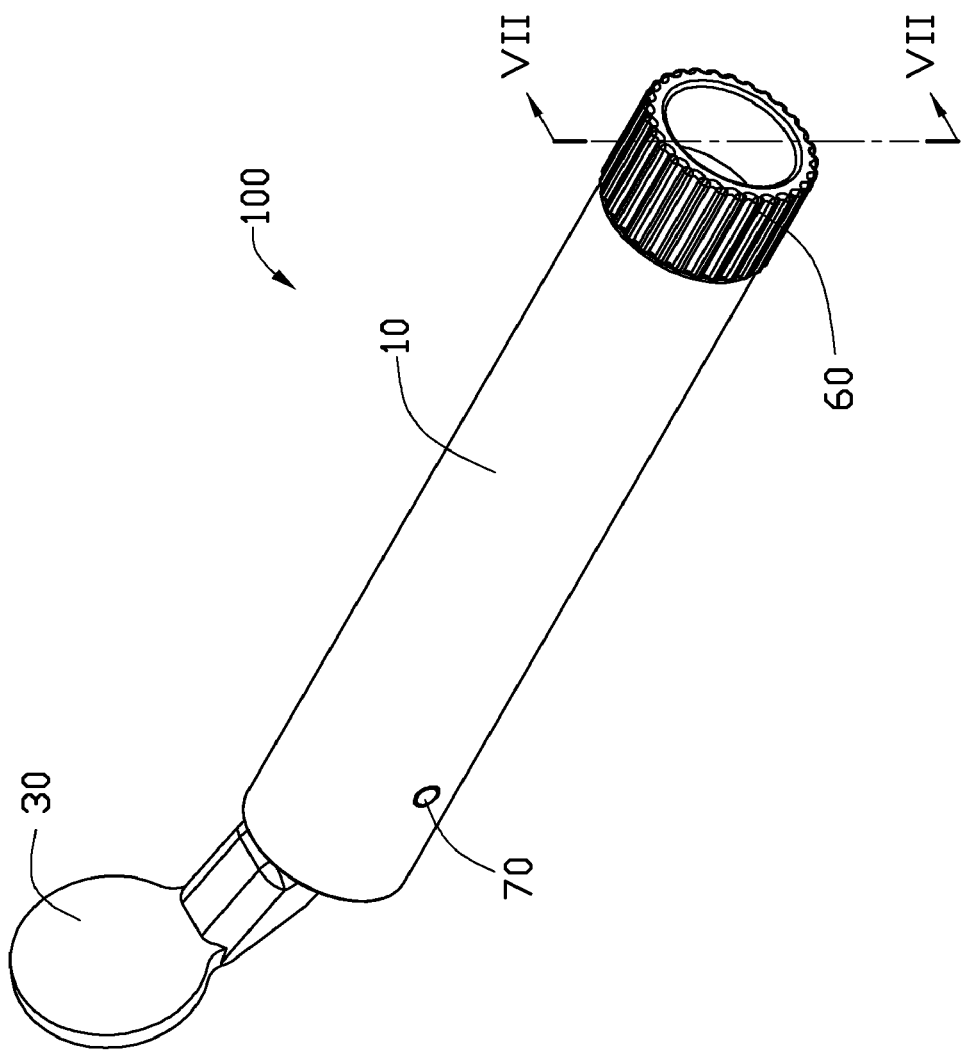
FIG. 6 is similar to FIG. 3, but showing the stylus in a tilted position.

Referring to FIGS. 1 and 4, the guiding element 20 is tubular, and includes a peripheral wall 22 that encloses a chamber 24 therein. The guiding element 20 has two guiding grooves 222 aligned longitudinally through the peripheral wall 22 and located at one end thereof. The guiding grooves 222 are for guiding the follower 50 to slide relative to the guiding element 20 so the follower 50 can slide relative to the housing 10. The guiding element 20, further has a notch 224 and two aligned through holes 226 defined at another end thereof. The notch 224 is used for providing a tilting space for the stylus body 30 tilting relative to the guiding element 20 (see FIG. 6). To retain the guiding element 20 in the housing 10, the through holes 226 are aligned with the retaining holes 122, and the pin 70 is inserted in the retaining holes 122 and the through holes 226 so the guiding element 20 is retained into the housing 10.

Referring to FIGS. 1 and 4, the stylus body 30 is received within the chamber 222 of the guiding element 20 and partially protrudes out of the housing 10. The stylus body 30 is used to contact a touch screen display of an electronic device (not shown). The stylus body 30, in this embodiment, may include a body 32 and a head 34 protruding from a first body end of the body 32. The body 32 has generally the same shape as, but slightly smaller than, the chamber 222, so the body 32 can tilt relative to the guiding element 20. The stylus body 30 further defines a gap 322 along a longitudinal direction and located at a second body end thereof. The gap 322 is used for accommodating the connecting rod 40. The stylus body 30 further defines two aligned pin holes 324 near the second body end and two aligned retaining slots 326 near the center thereof. The pin holes 324 and the retaining slots 326 are for hinging the stylus body 30 to the connecting rod 40.

Figure 5:
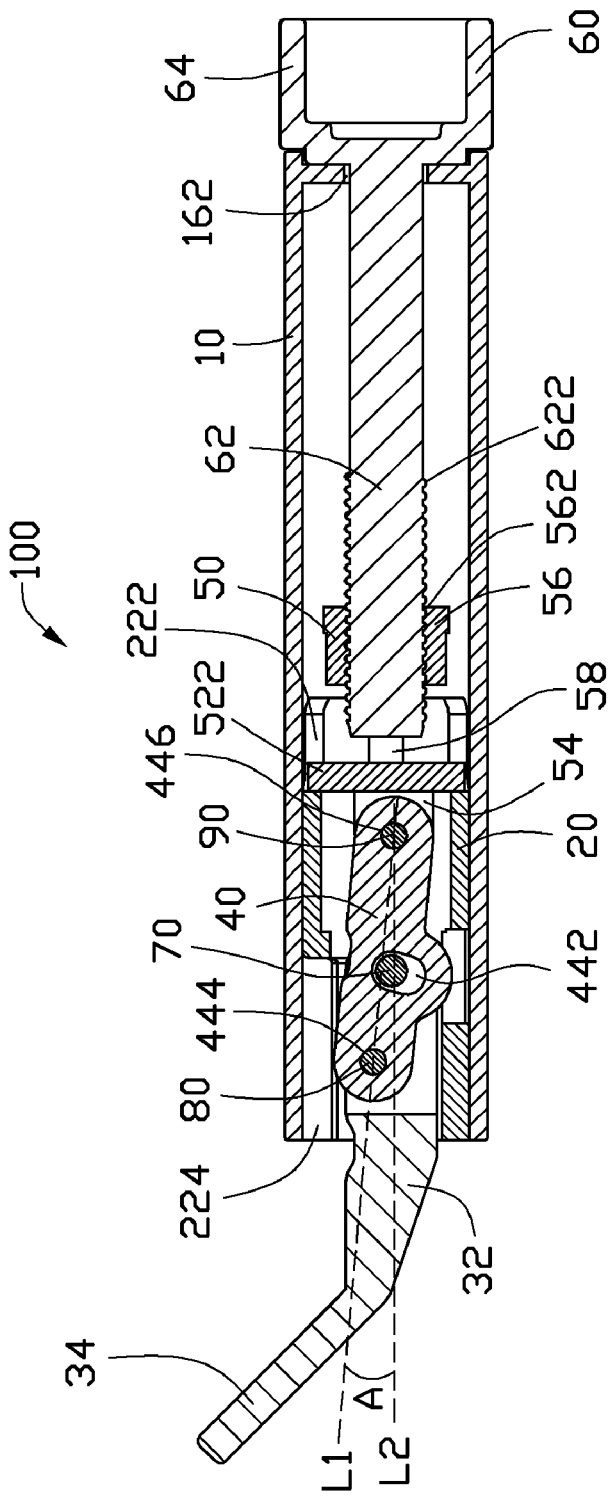
FIG. 5 is a cross-sectional view of the stylus in FIG. 3 along the line V-V, and wherein the stylus is in a retracted position.

Referring to FIGS. 1 and 5, the connecting rod 40 includes an opening 444 defined near a first connecting rod end thereof, a sliding groove 442 defined near the center portion thereof and a hollow 446 defined near a second connecting rod end thereof. When the connecting rod 40 is located in the gap 322, the opening 444 is aligned with the retaining slots 326, and the post 80 is inserted in the retaining slots 326 and the opening 444 to hinge the first connecting rod end of the connecting rod 40 near the center portion of the stylus body 30. The sliding groove 442 is aligned with the pin holes 324, the pin 70 is inserted in the sliding groove 442 and the pin holes 324 so the center of the connecting rod 40 is hinged near the second body end of the stylus body 30. The hollow 446 is for hinging the second connecting rod end to the guiding element 20. When the stylus body 30 is located in a retracted position shown in FIG. 5, the connecting line L1 of the opening 444 and the hollow 446 is angularly aligned with an axis L2 of the axle 60, for clarification, the angle between the line L1 and the axis L2 is labeled as A.

Figure 7:
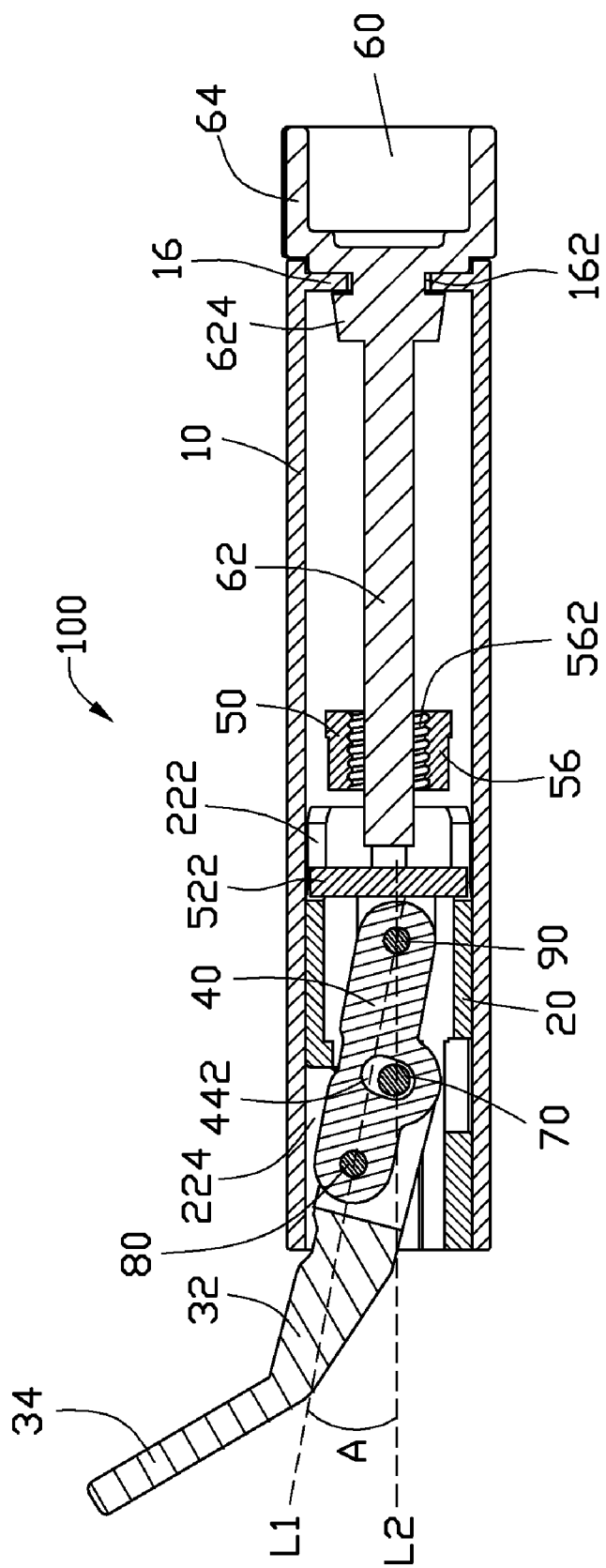
FIG. 7 is a cross-sectional and partially enlarged view of the stylus in FIG. 6 along the line VII-VII.

Referring to FIGS. 1 and 7, the follower 50 includes a main body 52, two opposite plates 54 protruding from one side of the main body 52, two opposite bars 58 protruding from another side of the main body 52 and a nut 56 mounted to a distal end of each bar 58. The follower 50 further includes two opposite guiding blocks 522 preferably protruding from the main body 52, and each guiding block 522 slidably locates in one of guiding grooves 222 of the guiding element 20, to guide the follower 50 to slide relative to the guiding element 20 and the housing 10. Each plate 54 defines a cavity 542 aligned with the hollow 446 and the pole 90 is inserted in the cavities 542 and hollow 446 so the follower 50 is hinged to the second connecting rod end. The nut 56 has a threaded hole 562 therethrough for engaging with the axle 60.

Referring to FIGS. 1, 5, and 7, the axle 60 includes a shaft 62 and lug 64 positioned at one side of the shaft 62. The axle 60 further includes a threaded portion 622 defined on the shaft and engaging with the threaded hole 562. The axle 60 further includes two protrusions 624 protruding from the shaft 62 and positioned between the threaded portion 622 and the lug 64, and the protrusions 624 are spaced apart from the lug 64. When the axle 60 is accommodated in the receptacle 11, the retaining board 16 is held between the lug 64 and the protrusions 624, thereby preventing the axle 60 and the housing 10 from separating.

Referring to FIGS. 1, 4 and 7, in assembly, the first connecting rod end is inserted in the gap 322, with the retaining slots 326 aligning with the opening 444 and the pin holes 324 aligning with the sliding groove 442. The post 80 is inserted in the retaining slots 3206 and the opening 444 so the first connecting rod end is hinged near the center of the stylus body 30. The second connecting rod end is inserted between the plates 54 until the cavities 542 are aligned with the hollow 446. The pole 90 is inserted in the cavities 542 and the hollow 446 so the second connecting rod end is hinged to the follower 50. The guiding element 20 is inserted in the receptacle 11 until the through holes 226 are aligned with the retaining holes 122. The axle 60 is inserted into the receptacle 11 from the aperture 162 until the protrusions 624 pass through the slits 164. At this time, the retaining board 16 is held between the lug 64 and the protrusions 624, thereby preventing the axle 60 and the housing 10 from separating. The protrusions 624, in this exemplary embodiment, are larger than the slits 164 so the protrusions 624 can not freely pass through the slits 164, thereby can prevent the axle 60 and the housing 10 from separating. The follower 50 is inserted in the receptacle 11 and screws on the threaded portion 622. Then, rotating the follower 50 until the sliding groove 442 is aligned with the through holes 226 and the guiding blocks 522 are located in the guiding grooves 222. The pin 70 is inserted in the retaining holes 122, the through holes 226 and the sliding groove 442 so the guiding element 20, the connecting rod 40 are both retained in the housing 10 by the pin 70.

Referring to FIGS. 3-7, in use, the axle 60 is rotated relative to the housing 10, such as by rotation of the lug 64. As the threaded hole 562 of the follower 50 engages with the threaded portion 622 of the axle 60, the axle 60 is rotated, the follower 50 should rotate relative to the axle 60, but the sliding blocks 522 are accommodated in the guiding grooves 222 to limit the rotation of the follower 50 relative to the axle 60. Thereby, as the axle 60 rotates, the follower 50 will slide relative to the guiding element 20 along the guiding grooves 222 toward and away from the connecting rod 40 so the connecting rod 40 slides together with the follower 50 relative to the housing 10. At this time, the pin 70 slides in the sliding groove 442 so the connecting rod 40 may extend or retract the stylus body 30 by the pin 70, to enlarge or reduce the angle A like shown in FIG. 7. Thus, the stylus body 30 is tiled relative to the housing 10.

It is understood that the housing 10 and the guiding element 20 can be integrated in to one integrated element in which the guiding element 20 may be omitted and the guiding groove 222 directly defined in the housing 10.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
 a housing assembly having a receptacle longitudinally defined therethrough;
 an axle rotatably mounted to the receptacle;
 a guiding element defining at least one guiding groove;
 a follower received in the housing and threadedly engaging with the axle, the follower having at least one guiding block protruding from peripheral wall thereof and slidably located in the guiding groove of the guiding element;
 a connecting rod accommodated in the receptacle of the housing, the connecting rod defining a sliding groove adjacent to a center portion thereof, the connecting rod including a first connecting rod end and a second connecting rod end opposite to the first connecting rod end, the second connecting rod connected to the follower;
 a stylus body received in the guiding element and the stylus body and the guiding element received in the receptacle, the stylus body having a body hinged to the first connecting rod end and a head positioned at a first body end of the body, the body having a pin hole defined at a second body end of the body opposite to the first body end; and
 a pin passing through the pin hole, the sliding groove, the guiding element and the housing to hinge the guiding element, the stylus body and the connecting rod within the housing;
 wherein when the axle is rotated relative to the housing, the guiding element prevents the rotation of the follower, forcing the follower to slide relative to the guiding element along the guiding groove, the sliding of the follower causing the connecting rod to slide, and the pin to slide in the sliding groove to cause the connecting rod to extend or retract the stylus body by the pin for tilting the stylus body relative to the housing.

2. The stylus as claimed in claim 1, wherein the stylus body defines a retaining slot near a center portion thereof, the connecting rod defines an opening at the first connecting rod end and aligned with the retaining slots; the stylus further includes a post inserted in the retaining slots and the opening so the first connecting rod end is hinged near the center portion of the stylus body.

3. The stylus as claimed in claim 2, wherein the follower defines a cavity, the connecting rod defines a hollow at the second connecting rod end and aligned with the cavity; the stylus further includes a pole inserted in the cavity and the hollow so the second connecting rod end is hinged to the follower.

4. The stylus as claimed in claim 1, wherein the axle includes a threaded portion formed thereon, the follower includes a main body, a nut positioned on one side of the main body and screwed on the threaded portion.

5. The stylus as claimed in claim 4, wherein the axle further includes a shaft, the threaded portion is formed on one end of the shaft; the axle further includes an operating portion positioned at another end of the shaft and a protrusion protruding between the threaded portion and the operating portion.

6. The stylus as claimed in claim 5, wherein the housing includes a retaining board positioned in the receptacle; the retaining board is held between the operating portion and the protrusion, thereby preventing the axle and the housing from separating.

7. The stylus as claimed in claim 6, wherein the retaining board defines an aperture for the shaft passing through the retaining board and defines a slit communicating with the aperture so the protrusion can pass through the retaining board.

8. The stylus as claimed in claim 6, wherein the guiding element further defines a notch for the stylus body tilting relative to the guiding element.

9. The stylus as claimed in claim 8, wherein the housing defines two aligned retaining holes, and the guiding element further defines two aligned through holes, the through holes are aligned with the retaining hole and the pin is inserted in the retaining holes and the through hole to retain the guiding element in the housing.

10. A stylus, comprising:
   a housing having a receptacle longitudinally defined therethrough;
   an axle rotatably mounted in the receptacle;
   a follower slidably and non-rotatably received in the housing, the follower threadedly connected with the axle;
   a guiding element defining two guiding grooves, the follower slidably received in the guiding grooves of the guiding element to guide the follower to slide relative to the housing and limit the follower to rotate relative to the housing;
   a stylus body received in the guiding element, the stylus body and the guiding element received in the receptacle, the stylus body having a body and a head positioned at a first body end of the body and a second body end of the body opposite to the first body end hinged to the housing; and
   a connecting rod including a first connecting rod end hinged near the center of the stylus body and a second connecting rod end hinged to the follower, the center of the connecting rod hinged to the housing;
   wherein when the axle rotates relative to the housing, the guiding element prevents the rotation of the follower, forcing the follower to slide relative to the guiding element along the guiding groove, the sliding of the follower causing the connecting rod to slide, and the pin to slide in the sliding groove to cause the connecting rod to extend or retract the stylus body by the pin for tilting the stylus body relative to the housing.

11. The stylus as claimed in claim 10, wherein the stylus body defines a retaining slot near the center portion thereof, the connecting rod defines an opening at the first connecting rod end and aligned with the retaining slots; the stylus further includes a post inserted in the retaining slots and the opening so the first connecting rod end is hinged near the center of the stylus body.

12. The stylus as claimed in claim 11, wherein the follower defines a cavity, the connecting rod defines hollow at the second connecting rod end and aligned with the cavity; the stylus further includes a pole inserted in the cavity and the hollow so the second connecting rod end is hinged to the follower.

13. The stylus as claimed in claim 10, wherein the axle includes a threaded portion formed thereon, the follower includes a main body, a nut positioned on one side of the main body and screwed on the threaded portion.

14. The stylus as claimed in claim 13, wherein the axle further includes a shaft, the threaded portion is formed on one end of the shaft; the axle further includes an operating portion positioned at another end of the shaft and a protrusion protruding between the threaded portion and the operating portion.

15. The stylus as claimed in claim 14, wherein the stylus further includes a retaining board positioned in the receptacle; the retaining board is held between the operating portion and the protrusion, thereby preventing the axle and the housing from separating.

16. The stylus as claimed in claim 15, wherein the follower includes a guiding block protruding from peripheral wall thereof, the guiding block is slidalby located in the guiding groove.

* * * * *